US011978062B2

(12) United States Patent
Ivanov

(10) Patent No.: US 11,978,062 B2
(45) Date of Patent: May 7, 2024

(54) SYSTEM AND METHOD FOR DETECTING MALICIOUS USE OF A REMOTE ADMINISTRATION TOOL

(71) Applicant: AO Kaspersky Lab, Moscow (RU)

(72) Inventor: Sergey N. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 395 days.

(21) Appl. No.: 17/160,523

(22) Filed: Jan. 28, 2021

(65) Prior Publication Data

US 2022/0058660 A1 Feb. 24, 2022

(30) Foreign Application Priority Data

Aug. 24, 2020 (RU) .................................. 2020128096

(51) Int. Cl.
*G06F 21/00* (2013.01)
*G06F 3/023* (2006.01)
*G06F 16/245* (2019.01)
*G06F 21/55* (2013.01)
*G06F 21/62* (2013.01)
*G06Q 30/018* (2023.01)
*G06Q 20/10* (2012.01)
*G06Q 20/40* (2012.01)
*G06Q 40/02* (2023.01)
*G06Q 50/26* (2012.01)

(52) U.S. Cl.
CPC ......... *G06Q 30/0185* (2013.01); *G06F 3/023* (2013.01); *G06F 16/245* (2019.01); *G06F 21/554* (2013.01); *G06F 21/6245* (2013.01); *G06Q 20/108* (2013.01); *G06Q 20/4016* (2013.01); *G06Q 40/02* (2013.01); *G06Q 50/265* (2013.01)

(58) Field of Classification Search
CPC .. G06Q 50/265; G06Q 40/02; G06Q 20/4016; G06Q 20/108; G06Q 30/0185; G06F 21/6245; G06F 21/554; G06F 3/023; G06F 16/245
USPC .......................................................... 726/26
See application file for complete search history.

(56) References Cited

U.S. PATENT DOCUMENTS

| 2007/0174429 A1* | 7/2007 | Mazzaferri | ........... | H04L 63/102 |
| | | | | 709/218 |
| 2008/0098411 A1* | 4/2008 | Dirstine | .................. | G06F 9/451 |
| | | | | 709/217 |
| 2014/0317744 A1* | 10/2014 | Turgeman | ........... | H04W 12/122 |
| | | | | 726/23 |

(Continued)

FOREIGN PATENT DOCUMENTS

WO WO-2019025749 A1 * 2/2019 ............. B21D 53/06

*Primary Examiner* — Josnel Jeudy
(74) *Attorney, Agent, or Firm* — ArentFox Schiff LLP; Michael Fainberg

(57) ABSTRACT

Disclosed herein are systems and methods for detecting malicious use of a remote administration tool. In one aspect, an exemplary method comprises, gathering, from a flow of events, data that comprises any number of keyboard entry events, wherein each event is related at least to actions indicating a keyboard entry and a context in which the event occurred, comparing the gathered keyboard entry events with signatures from a database, and when a match is found with at least one signature, identifying an activity which is a characteristic that indicates that the remote administration tool is being controlled remotely.

24 Claims, 6 Drawing Sheets

(56) References Cited

U.S. PATENT DOCUMENTS

2015/0324802 A1    11/2015   Kolkowitz et al.
2016/0308888 A1*   10/2016   Vargas Gonzalez .... G06F 21/56
2019/0007397 A1*    1/2019   Goldberg .............. H04W 12/08

* cited by examiner

SYSTEM AND METHOD FOR DETECTING MALICIOUS USE OF A REMOTE ADMINISTRATION TOOL

CROSS REFERENCE TO RELATED APPLICATIONS

The present application claims priority to Russian Patent Application No. 2020128096, filed on Aug. 24, 2020, the entire content of which is incorporated herein by reference.

FIELD OF TECHNOLOGY

The present disclosure relates to the field of identifying cases of fraud in the sphere of providing online financial services. Specifically, to systems and method for detecting fraud that is remotely conducted using a remote administration tool. For example, devices used for remotely performing fraudulent activities may be detected using signatures.

BACKGROUND

In everyday life, millions of people make use of various electronic devices such as desktop computers, notebooks, tablets and smartphones to carry on various kinds of activity. Such activity may include, for example, viewing the Internet, sending and receiving electronic mail, making photos and videos, participating in video conferencing or chats, games, and so forth. Certain actions may be privileged or may require authentication of the user, in order to guarantee that only an authorized user is participating in them. For example, it is necessary for the user to enter their username and password for access to their email account.

Moreover, each year the sphere of online financial services, such as banking services or Internet commerce, is becoming increasingly popular among users. At the present time, the user of such services already has the ability to interact online with banks, make payments via various methods, transfer funds, and the like. The numbers of ways for interactions with online financial services and the numbers of other similar services continue to grow and improve. A variety of payment systems, plastic cards and banking services (bank services are often called remote bank services) allow the user to perform various transactions. For example, one of the new possibilities is a transfer of funds between banks using a telephone number. Moreover, new technologies of contactless payment, online banking, and mobile banking are making it possible to perform monetary transactions without the involvement of a plastic card or bank account details.

All of these possibilities for the use of electronic devices are attracting various fraudsters. Therefore, in order to protect against different kinds of fraud by third parties, it is necessary to implement protection of both the electronic devices themselves and the software providing access to privileged services, such as financial services.

There are various mechanisms for protecting electronic devices of a user against access by third parties. For example, a PIN code is used for protecting plastic cards during purchases. This PIN must be entered on a terminal at the time of payment or when performing transactions using the card at an automated teller machine (ATM). If the card is lost, a third party will not be able to use it, since the third party does not know the PIN code of the card. In another example, when a user is interacting with an operator of a bank call center, a secret question or a secret word may be employed to identify the user. When the user is working with online banking, a method for dual authentication may be used. After entering the login and password (which may have become accessible to third parties) in the browser on the bank site, the user is sent a message to their mobile telephone by the bank service, containing for example an additional verification code that must be entered in a special box to confirm the legitimacy of the login.

However, the above mechanisms for providing protection do not fully ensure the security of the user's devices against hackers. There are many complex attacks carried out by hackers in order to gain access to the user's funds. Such attacks generally make use of vulnerable aspects in the interaction of a user with the banking services and merchant sites where online payments are made. Such attacks are often generally referred to as "fraud", in particular "scam". One of the methods for perpetrating such fraud is to obtain unlawful access to the computing device of a user by employing malicious software such as a "Remote Administration Trojan", allowing the hackers to gain control over the computer, while hiding behind perfectly lawful actions. These must be actively combatted, because not only are they very dangerous, but also quite widespread.

Typical techniques for detecting malicious software, such as a Remote Administration Trojan, are techniques used for: identification of devices by their digital fingerprint, detection of a proxy server, detection of the scanning of open network ports, determination of geolocations of IP addresses, and detection of anomalies in network activities. However, these techniques have shortcomings and are not effective when there is a question of counteracting the attacks of fraudsters who have gained access to a remote administration means (Remote Administration Tool or RAT). Once they gain access to a RAT, these fraudsters perform various operations, including financial transactions, in the name of the user (owner) directly from the computer of the user. In this case, it is difficult (if not impossible) to prevent the fraud, since the fraudulent activity is being performed directly from the computer of the actual user while making use of software disguised as the actual user.

Therefore, there is a need for a more optimal and effective way to prevent this kind of fraud. In other words, there is a need to detect and perform an evaluation of the activities taking place using remote administration tools.

SUMMARY

Aspects of the disclosure relate to preventing fraud, more specifically, to systems and methods for detecting malicious use of a remote administration tool.

In one exemplary aspect, a method is provided for detecting malicious use of a remote administration tool, the method comprising: gathering, from a flow of events, data that comprises any number of keyboard entry events, wherein each event is related at least to actions indicating a keyboard entry and a context in which the event occurred, comparing the gathered keyboard entry events with signatures from a database, and when a match is found with at least one signature, identifying an activity which is a characteristic that indicates that the remote administration tool is being controlled remotely.

In one aspect, each signature comprises: a sequence of keyboard entry events, a time condition, and an indicator for a start of a count to calculate the time condition, wherein each keyboard entry event describes an action performed with a key during entry from a keyboard.

In one aspect, the comparison of the keyboard events with the signatures includes: a preliminary analysis of the keyboard entry events and a search for a particular sequence of keyboard entry events which is characteristic of a remote control of a remote administration tool, wherein the preliminary analysis takes into account the context of the keyboard entry event.

In one aspect, the preliminary analysis includes a comparison with signatures corresponding to the context.

In one aspect, the preliminary analysis, for each keyboard entry event, includes: a determination of a group to which the key belongs, a presence of a modifier being used with the key, and a type of operation being performed, the type of operation including at least pressing or releasing of a key; a determination of a time condition indicating a delay between adjacent events, and an indicator for a start of counting of time; and a determination of the context in which the event occurred.

In one aspect, comparison with the signatures corresponding to the context comprises: searching for the sequence of keyboard entry events; and determining that the signature is found in the flow of events when all the conditions of the signature are fulfilled, wherein the conditions include at least finding of a particular keyboard entry sequence.

In one aspect, the method further comprises: performing actions for protecting against online malicious activity, wherein the action include at least one of: interrupting a process of the remote administration tool or a network port, blocking a session with an online service, breaking a connection to a remote device, and informing a user about the identified activity.

In one aspect, the malicious activity comprises a fraud conducted using a remote administration tool.

According to one aspect of the disclosure, a system is provided for detecting malicious use of a remote administration tool, the system comprising a hardware processor configured to: gather, from a flow of events, data that comprises any number of keyboard entry events, wherein each event is related at least to actions indicating a keyboard entry and a context in which the event occurred, compare the gathered keyboard entry events with signatures from a database, and when a match is found with at least one signature, identify an activity which is a characteristic that indicates that the remote administration tool is being controlled remotely.

In one exemplary aspect, a non-transitory computer-readable medium is provided storing a set of instructions thereon for detecting malicious use of a remote administration tool, wherein the set of instructions comprises instructions for: gathering, from a flow of events, data that comprises any number of keyboard entry events, wherein each event is related at least to actions indicating a keyboard entry and a context in which the event occurred, comparing the gathered keyboard entry events with signatures from a database, and when a match is found with at least one signature, identifying an activity which is a characteristic that indicates that the remote administration tool is being controlled remotely.

The method and system of the present disclosure are designed to provide data security, in a more optimal and effective manner and to prevent fraud that may be conducted using remote administration tools, e.g., RATs. When evaluating activities, the method of the present disclosure determines the fact that the activities are taking place via a remote service, while directly being performed from a computer where a remote administration tool is installed, or by using remote access. In particular, the method and system of the present disclosure ensure that the unauthorized control of the remote administration tools (RAT tools) are detected using signatures (patterns), which in turn enables sequences of keyboard entry events to be detected. Such signatures for use in detecting unlawful or unauthorized access to a computer are created—thereby enabling detection of fraud conducted via unauthorized control of remote administration tools.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
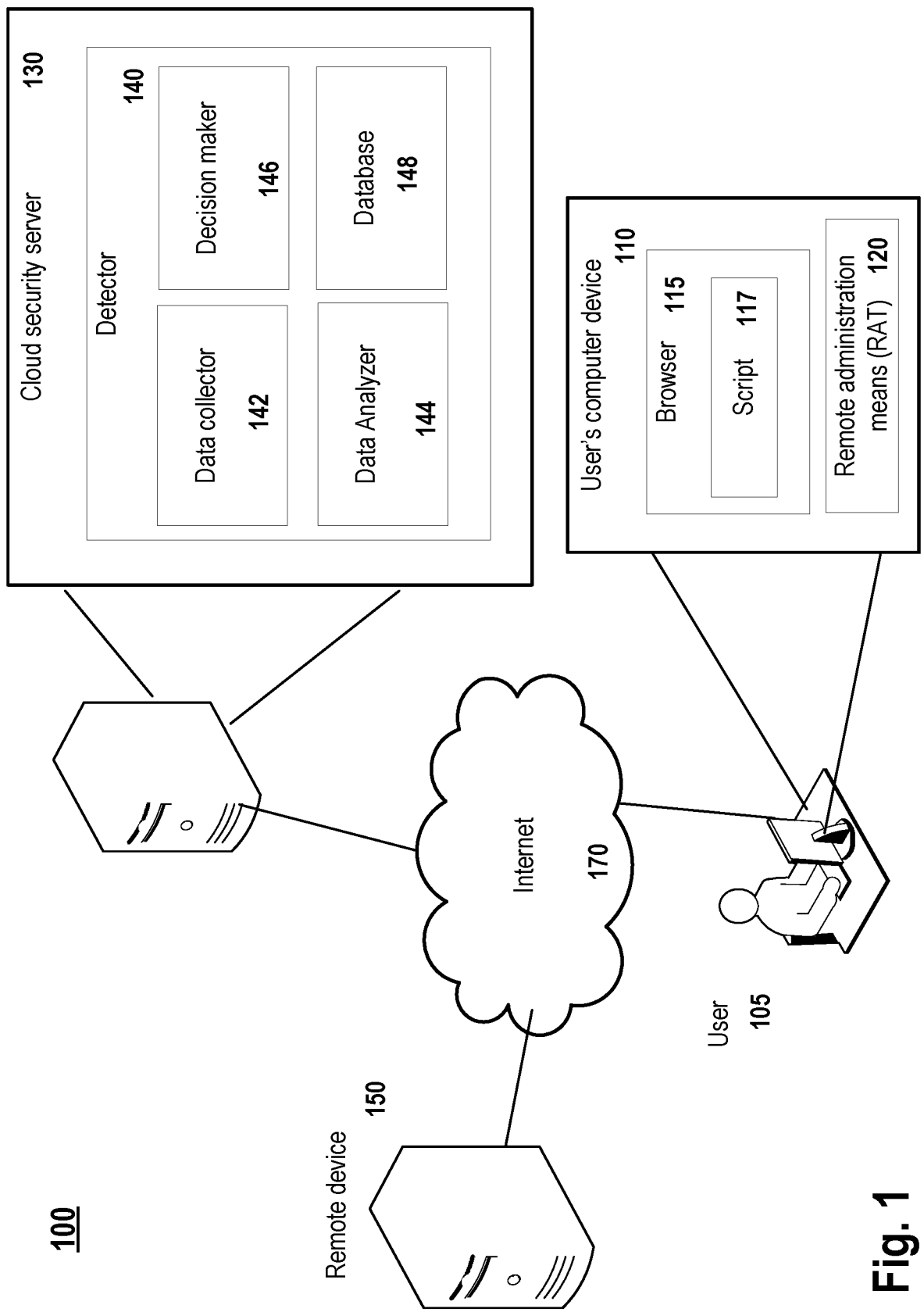
FIG. 1 illustrates a system for detecting activities which indicate a remote control of a remote administration tool (RAT).

Exemplary aspects are described herein in the context of a system, method, and a computer program for detecting malicious use of a remote administration tool in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

The method of the present disclosure enables identification of instances of frauds that occur, during interactions with systems that provide online financial services. The fraud may involve one or more of: obtaining unlawful access to the computer of a user using remote administration means. The remote administration means may include: Remote Administration Tool (RAT), varieties of malicious programs such as a remote access Trojan (Remote Administration Trojan), and programs that perform operations in the name of the user directly from the computing device of the user.

The method of the present disclosure also enhances the security of sessions involving financial services performed through remote administration means (hereinafter, RAT tools), by using a method for detecting remote control of a RAT tool. This method is implemented, in particular, with the aid of the computer device represented in FIG. 6, and it involves the analysis of events occurring and involving keyboard entry of data, and the detection of unique sequences of keyboard entry events which are characteristic of the corresponding RAT tools and at the same time are not characteristic of local (physical or virtual) keyboard entry by the user. The method of the present disclosure enables identification of remote control of a RAT tool and then detects the fraudulent actions being perpetrated via such remote control.

In one aspect, the computer device comprises a mobile device, such as a smartphone or a tablet computer, for example. In these instances, local keyboard entry by the user also may include entry with the aid of a virtual keyboard.

When using a virtual keyboard, in the absence of an external keyboard, the keyboard entry of data, in particular on mobile devices, is performed with the aid of a separate application that depicts a keyboard and alters text directly in the entry field of the application where it is necessary to enter data. An example of such an application is the IME Method. In this case, the source of the events is the virtual keyboard.

It should be noted that the nature of said sequences of events is dictated by the characteristics of the remote control protocols used and the specific implementations of those protocols, as well as a current environment of the computing device. By the environment is meant, for example, the operating system being used, the browser, or applications including a RAT tool. Yet another characteristic of such sequences of events, by virtue of their content and consideration of time conditions, is that it is impossible for the user to perform actions by physical pressing keys on a local keyboard. In this disclosure, the keyboard may comprise either a physical or a virtual keyboard.

Moreover, the origin of the events mentioned above may involve not only the usage of a local (physical or virtual) keyboard, but also a usage of a keyboard (physical or virtual) of a device from which the remote control of a RAT tool is taking place.

In one aspect, the initial information for analysis, such as the flow of events occurring, among which are keyboard entry events, is gathered with the aid of javascript—a processor implemented in the context of a web page opened in a browser on the computer of the user during a session with a remote server providing online financial services.

Furthermore, an important aspect in the analysis of the gathered information includes the aspect of privacy and protection of the personal data of the user. Therefore, the method of the present disclosure gathers only the data (events) that does not contain information about specific keys, but rather only includes data on the group to which the key belongs (such as a letter, a numeral, a modifier key, a service key), the time characteristics (the speed of occurrence of the event), and the type of event (key pressed or released), and so on. Thus, it is not possible to identify that user data. Such data may be referred to as "depersonalized" data. Since only the depersonalized data is gathered, it is sufficient for the present method to detect only the activity being performed remotely using a RAT tool for access to a remote server, such as an activity for accessing an online banking service.

In one aspect, the method of the present disclosure detects the sequences of keyboard entry events within the flow of events that occurred. The detection of the sequence of keyboard entry event is performed using signatures which were previously created. The signatures are created to enable identification of activities being performed remotely (i.e. the user is not performing locally entering input from a keyboard) on an electronic device with the aid of a remote administration means during interactions with remote services.

Each signature (i.e., each pattern) describes: a sequence of keyboard entry events (pressing and releasing the keys of the keyboard), a time condition, and an indicator of the start of the counting in order to calculate the given time condition. The time condition characterizes the delays between adjacent events of pressing and/or releasing keys. As mentioned above, the defined time conditions enable distinguishing and identification of which keys are being pressed with the aid of software and which keys are being pressed by a user on a local keyboard. In other words, the method will be able to differentiate between keys pressed by the user on a local keyboard and keys which are pressed with the aid of software.

Figure 2:
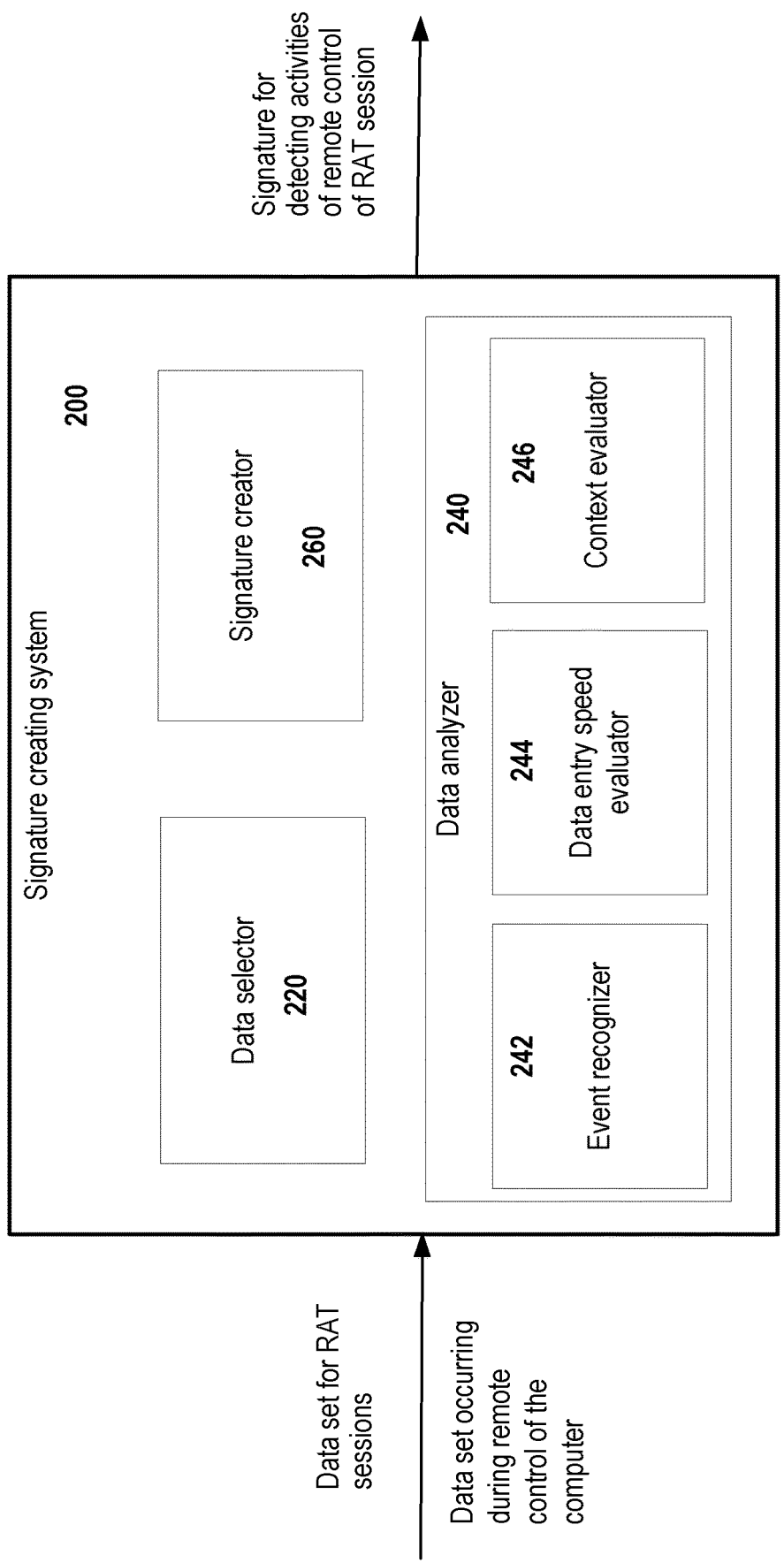
FIG. 2 illustrates a system for creating signatures for detecting remote control of a remote administration tool.

FIG. 1 illustrates a system 100 for detecting activities which indicate a remote control of a remote administration tool (RAT). FIG. 2 illustrates a system 200 for creating signatures for detecting remote control of a remote administration tool. (FIG. 2 is described below).

The systems 100 and 200 (described below) are implemented on a computing system (e.g., a computer), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 6). Furthermore, the system components may be realized either within a single computing device or spread out among several interconnected computing devices. Thus, the systems 100 and 200 may be realized using an appropriate hardware components and/or software modules, which may be arranged together or may reside at several locations or on several devices. The components and/or modules of the systems may then interact or exchange data by one or more wireless communication lines, wired communication lines, cellular communications, a client/server architecture, a peer-to-peer architecture, and so forth.

Thus, in one aspect, the system 100 includes:
- a browser 115, implemented on the computer device 110 of a user 105;
- a script 117, implemented in the browser 115;
- a remote device 150, providing services to the user 105 via the computer device 110, e.g., such as providing banking services; and
- a detector 140, implemented in a cloud security server 130, and with which the script 117 interacts.

The computer device 110 (hereinafter, the device 110) of the user 105 contains a software execution environment (such as an operating system), in which the browser 115 is implemented.

In one aspect, when interacting with the remote device 150 presenting services to the device 110 via the browser 115, the remote server 150 sends a web page to the browser 115, wherein the webpage contains the script 117 (in other words, the code of a script).

In one aspect, the script 117 may be written in JavaScript language.

In one aspect, the remote device 150 may be at least one of the following devices:
- a bank server (services provided: payments, loans, loyalty programs);
- a server of a micro-financing organization (payments, loans);
- a server of an online store (loyalty programs);
- a server of a provider of telecommunication services (payments, loyalty programs); and
- a server of a logistics (transportation) company (payments, loyalty programs).

In one aspect, the script 117 is executed upon opening in the browser 115, wherein the web page is received from the remote device 150. The results of the execution are sent by the script 117 to the detector 140. Then, the detector 140 analyzes the results obtained from the script 117.

In one aspect, the results of the execution are sent in real time mode.

In one aspect, during interaction with the remote device 150 through the web page that is obtained from the remote device 150 and opened in the browser 115, the script 117 monitors and gathers data (events) related at least to actions indicating a keyboard entry and the context of those actions. The events related to keyboard entry are also known as "KeyEvent" events.

As was mentioned above, in order to ensure privacy and confidentiality of the data gathered, information is not collected on the keys pressed directly, but instead information is only collected on the group of keys, the modifier keys used, and the type of action being performed on the key (pressing or releasing). Examples of the groups of keys are at least groups such as letters, numerals, modifier keys and service keys.

In order to identify the context of actions in an interaction with the remote device 150, the script 117 gathers at least one of the following data items about the environment:
- available information about the browser 115;
- available information about the applications interacting with the browser (plugins or external applications), such as the remote administration means (the RAT tool) 120; and
- available information about the device 110 (for example, the operating system, the network ports, the IP addresses, the processor, and so forth).

Upon opening the web page, the browser 115 sends identification information to the remote device 150. The identification information is a text string which is a part of an HTTP request starting with "User-Agent" and usually including information such as the name of the browser 115, the version of the browser 115, information about the operating system of the device 110 (name, version, and so forth), the language of the operating system of the device 110, and other information. The data containing that information may be received by the script 117, or may be calculated by the detector 140 based on the information received by the script 117.

The script 120 sends, to the detector 140, the data gathered on the activity taking place during the session with the remote device 150. In one aspect, the method of the present disclosure describes detection of remote control of a remote administration means 120 (RAT tool 120) during an interaction with a remote device 150. The detector 140 identifies actions characteristic of the remote control of the RAT tool 120 during the interaction with the remote device 150 based on an analysis of the gathered data, wherein the gathered data contains at least keyboard entry events. The identification of the actions is performed with the aid of signatures. Each signature contains a certain sequence of keyboard entry events and takes account of the context of the actions identified.

In one aspect, the detector 140 includes a data collector 142, a data analyzer 144, a decision maker 146 and a database 148 containing said signatures.

The data collector 142 is designed to obtain data from the script 117, including data on the keyboard entry events occurring in the context of an opened web page in the browser 115 on the device 110 in real time mode, and to send this to the data analyzer 144.

The data analyzer 144 performs an analysis of the identified keyboard entry events, during which it determines the groups of keys pressed for each event, identifies the type of operations being performed (for example, the pressing or releasing of keys of the keyboard), and determines the time conditions of the events identified (the time delays between adjacent events). On the basis of the determined data, the data analyzer 144 creates sequences of keyboard entry events with corresponding context, containing at least information on the operating system, the type of browser 115, and the RAT tool 120 being used.

The decision maker 146 makes a comparison of the sequences of keyboard entry events created with signatures from the database 148. Each signature contains a sequence of keyboard entry events which is characteristic of the particular RAT tool 120. Such a signature (signature of the first type) makes identification of actions possible. The actions indicate that the RAT tool 120 is being remotely controlled. Therefore, if at least one signature matches up, the decision maker 146 makes the decision that the RAT tool 120 is being controlled remotely. In other words, the signature contains: a particular order of key pressing and releasing events during the session of interacting with the remote device 150 by using the RAT tool 120, a time condition for the appearance of each event, and an indicator for starting the count to calculate the time condition.

In another aspect, the database 148 contains signatures enabling a definite determination that the keyboard entry of data occurred from a local entry device, such as a physical or virtual keyboard, i.e. there was no remote control (signature of the second type). In this case, the decision maker 146 may perform an additional verification by matching up the first signature and performing a comparison with signatures of the second type in the course of the main comparison. In the event of identifying a signature of the second type, a decision is made, wherein the decision indicates that the RAT tool is being controlled remotely. Such an additional verification using signatures of the second type reduces the likelihood of occurrence of errors of the first and second type (i.e., reduces false positives and false negatives). In cases when the main verification and a verification by signatures of the second type is performed, it is possible to reduce the time needed for checking for fraud in the session of interaction with the remote device 150.

In one aspect, the detector 140 also enables the detection of fraudulent actions being perpetrated using RAT tools 120. For example, when the detector 140 identifies an activity indicating remote control of a RAT tool 120, and the remote device 150 is a bank server, the detector 140 can make the decision, with the aid of the module 146, that there is fraudulent behavior. Then, actions aimed at protecting the device 110 of the user 105 against online fraud may be carried out. For example, such actions may be actions for: interrupting the process of working of the RAT tool 120 or the network port, blocking the session with the online service, breaking the connection to the remote device 150, and informing the user 105 about the identified activity with the aid of alternative communication means.

In one aspect, the blocking of the session with the online service may be performed with the aid of the script 117.

In one aspect, the detector 140 is realized together with the script 117.

In one aspect, the script 117 implements the tasks of the detector 140 entirely or partially. For example, the script contains the database 148 and compares the events occurring from the data flow with signatures of the database 148. A corresponding decision is made based on the results of the comparison.

FIG. 2 illustrates a system 200 for creating signatures for detecting remote control of a remote administration tool. The principle of searching for and creating new signatures is based on the difference in data between sessions making use of RAT tools and other sessions, by using methods for testing and detecting anomalies. By an "anomaly" is meant a certain unique sequence of events indicating the pressing and releasing of keys during entry on a keyboard (keyboard entry) which are characteristics only during remote entry via a RAT tool 120. Other characteristics of such activity may also be taken into account, such as the environment and the context of occurrence of the events. By "environment" is meant, as mentioned above, the setting in which the activity takes place, such as the applications launched and the type of operating system. Examples of applications are the browser Internet Explorer and the RAT tool Teamviewer. By the "context" is meant, for example, the features of operation of the session during which the activity is performed: a user on the operating system Windows works via a window on the operating system Linux. Other examples of context are the representation of a menu line of an application or the use of various text input languages.

In one aspect, the signature creating system 200 receives a set of data, for example from a cloud security server 130. The set of data contains at least information about the sessions making use of RAT tools 120 and the sessions without the use of RAT tools, and also information about the environment or context in which the sessions took place. Sessions using RAT tools contain data on sessions both with remote control of the RAT tool and without it. The data on the sessions is at least information about the keyboard entry events which have occurred. Keyboard entry events are also known as keyboard events for input from keyboard. An example of the information about the environment is information about the computer, the applications, the browser, the operating system, and the RAT tool. The set of data may be gathered in various ways, for example, with the aid of the cloud security server 130 itself, or presented by third party devices.

In one aspect, the cloud security server 130 builds up historical data about sessions with remote devices 150 making use of RAT tools 120; that is, it gathers data on activities having already occurred using RAT tools. Such data may be assembled in the course of the testing of the RAT tools, for example, when issuing a new version. In addition, data may be assembled in the process of remote connection with the aid of RAT tools, e.g., when rendering any service to the user with his or her consent.

The signature creating system 200 may be realized using appropriate hardware components and/or software modules, which may be arranged together or may reside at several locations or on several devices. For example, making use of the computer device represented in FIG. 6.

In one aspect, the signature creating system 200 includes a data selector 220, an data analyzer 240 and a signature creator 260. In turn, the data analyzer 240 may be functionally divided into an event recognizer 242, a data entry speed evaluator 244 and a context evaluator 246.

The data selector 220 is designed for the original selection of data about the sessions making use of RAT tools 120. The data selector 220 then sends the data to the data analyzer 240.

The data analyzer 240 is designed to analyze the received data concerning the keyboard entry events, and to identify characteristic features for the creation of new signatures. The sought characteristic features are data enabling the detection of remote control of a RAT tool 120 during a session with a remote device 150.

In one aspect, the data having characteristics for the creation of signatures for detection of a RAT tool being controlled remotely include at least some of the following:
  a particular order of keyboard events that occur during entry using a keyboard (the sequence of keyboard entry events);
  a time condition indicating delays between keyboard events;
  an indicator for a start of a count for the time condition;
  a trigger of activity, after which a comparison is made with a signature;
  a context in which the comparison with the signature is to be made;
  a presence of a particular RAT tool or an environment for the comparison with the signature.

Thus, in the first step the event recognizer 242 is used to determine, based on an analysis of the selected data for sessions making use of RAT tools 120, parameters for each keyboard event, such as: the group to which the key belongs, the presence of a modifier and the type of action being performed with the key. Examples of groups are: a letter, an arrow, an action, a number, and others. Modifiers are such keys as: "ctrl", "alt" and "shift". By the type of action is meant the pressing or releasing of a key.

In the second step, the data entry speed evaluator 244 is used to perform an analysis of the time of occurrence of keyboard events and the delays between keyboard events. Those events for which the delays between keyboard events are greater than 100 ms will not be considered, since they can be performed physically by the user when entering characters on a keyboard. In certain cases, a limit equal to 50 ms may be indicated to ensure maximum possible distinction from the capabilities of the user. This statement is based on the fact that a human being types at a limited speed, and therefore not every sequence of keys can be duplicated by a person for time reasons. For example, for the mean statistical user, the delay is around 300 ms per character, including two events—pressing down of the key and lifting up of the key. Accordingly, for one keyboard event ~150 ms elapses.

Therefore, events falling in the range of 0 to 100 ms will be considered afterwards, since they are created with high probability by software. It is possible to determine the exact time interval elapsed between adjacent events and the start of the count for the time condition.

In the third step, the context evaluation module 246 is used to perform an analysis of the data containing information about the environment in which the sessions being analyzed occurred, in order to determine the context of performance of the sessions and its influence on the sessions, or more precisely, on the events having occurred. Such information is at least information about the RAT tool, the browser, and the operating system. The presence of certain applications influences the appearance of certain keyboard entry events.

As a result of the investigation, the data analyzer 240 will generate data for creating a signature. The generated data is sent to the signature creator 260, which in turn generates the signature based on the received data.

The signature creator 260, at first performs a search for sequences of keyboard events enabling the distinguishing of sessions making use of RAT tools controlled remotely from other sessions. For this, in one aspect, the signature creator 260 uses a method of creating N-grams of a model, and using the created N-grams to break up the sequences of keyboard events of the sessions into parts. An N-gram is a sequence of n elements, namely, the keyboard events.

It should be noted that the N-grams are used to divide the sequences into fixed segments of N-length with some overlapping. For example, for four events [1, 2, 3, 4]: if the events are broken up into 2-grams, this will result in the following form: [1, 2], [2, 3], [3, 4].

Let us consider the example of creating N-grams whose length will be equal to four.

The signature creator 260, based on the data received about the keyboard events and their time conditions, creates two groups of 4-grams of the events, where one group corresponds to all the sessions and the second group to the sessions performed with the aid of RAT tools. Thus, each 4-gram consists of 4 keys. Each key constitutes the following set (<group>, <modifier>, <type of event>). For example, one key set contains the information: Action, -, Down. This designates a key from the group "action", which was pressed without modifiers.

Next, the signature creator 260, based on the time conditions, removes from the groups the N-grams lasting more than 50 ms, for example. It should be noted that the number of all sessions may significantly exceed the number of sessions with a RAT tool. Accordingly, the proportion for the groups of N-grams will be analogous.

Next the signature creator 260, constructs a limiting probability distribution (LPD) of the frequencies of appearance of each group of N-grams and selects only those groups of N-grams corresponding to a certain probability distribution. Thus, for each group of N-grams, the signature creator 260 determines the frequency of its appearance in all the sessions, including the sessions in which remote control of a RAT tool was used. Next, the N-grams from the group of sessions using RAT tools are ranked by frequency of appearance both for the sessions with RAT and for the entire set of sessions, and they are analyzed according to evaluation criteria. Thus, if an N-gram is present in the sessions using RATs, and absent from the other sessions, or its frequency of appearance is minimal, then that N-gram is a candidate for creating a signature. Another criterion is the evaluation of the context in which a sequence was identified in sessions where remote control of a RAT tool was performed and in the other sessions, since that makes it possible to find an additional discriminative criterion. Another criterion is the evaluation of the time condition, during which it is possible to change the time condition in order to limit the sessions which can be identified. The time condition can indicate delays both for the entire sequence and for each event individually. Yet another criterion is a trigger indicating the initial state for the comparison and identification of the signature. It should be noted that the set of evaluation criteria is used depending on the need. Furthermore, several criteria of the same type may be used when creating the signature, such as two or more sequences of keyboard events.

The signature creator 260 then creates at least one signature based on the difference between sessions using a RAT and all the sessions, taking into account the indicated criteria.

An example of a signature for detecting activity of remote control of a RAT tool during a session with a remote device 150 is the signature of the following kind: "Name of the signature containing information about the RAT tool and the context:
  at least one sequence of keyboard events (keyboard entry events);
  time conditions for the appearance of those events, where the conditions may change from one event to another;
  a trigger used for comparing that sequence with the flow of events occurring; and
  the presence of the corresponding context upon triggering of the signature".

Thus, for example, the sequence may be a combination of four keyboard events: (Meta, Shift, Up), (Numeric, -, Up), (Numeric, -, Down), (Numeric, -, Up); the time condition may be the time elapsed between events less than 60 ms; the trigger may be the pressing of the key "Caps Lock" and the use of a Russian-language keyboard; and the context may be the presence of the application TightVNC and the browser Internet Explorer 11.

It should be noted that the signature may comprise either one or several RAT tools.

In another aspect, the signature creating system 200 additionally creates signatures in similar fashion to enable the identification of activity occurring during a session using a RAT tool, and indicating that a local keyboard was used for the data entry. Such signatures make determination of the legitimacy of the usage use of the RAT tool during the session possible. Only in this case, for example, is a keyboard entry sequence determined which clearly indicates that a local keyboard was used for the entry. In another example of a signature, a time condition is determined (the distance in time between adjacent events) which, if it exceeds a certain value, then the chain of keyboard entry events was created by a user employing local entry devices. Such signatures allow false alarms in identifying activity indicating remote control of a RAT tool to be minimized, e.g., when used as an additional verification after one of the main signatures has been triggered.

Figure 3:
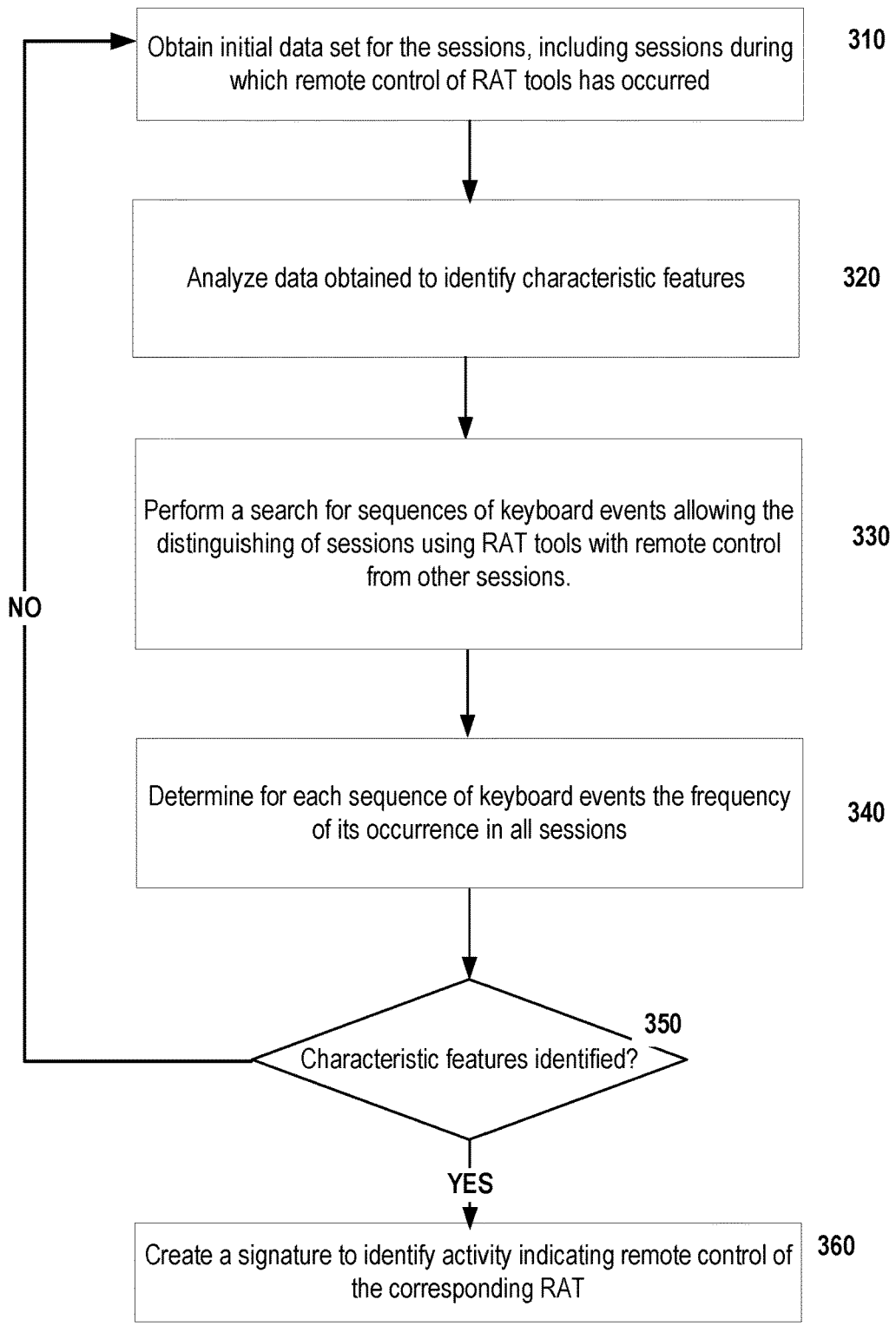
FIG. 3 illustrates an exemplary method for creating a signature for unlawful remote access to a remote administration tool.

FIG. 3 illustrates an exemplary method 300 for creating a signature for unlawful remote access to a remote administration tool. The method 300 shown may be realized using the system described in FIG. 2. Let us assume that it is necessary to perform testing of a certain set of data.

In step 310, by the data selector 220, method 300 obtains the starting set of data of the session during which RAT tools have been used, wherein the RAT tool is controlled from a local computer using a remote control.

In step 320, by the data analyzer 240, method 300 analyzes the received data in order to identify characteristic features for activity indicating remote control of a RAT tool during a session.

In one aspect, the received data comprises data about at least a flow of keyboard entry events.

In one aspect, the characteristic features for activity indicating the remote control of the RAT tool comprises at least one of:

a particular order of keyboard events occurring during entry from a keyboard (the sequence of keyboard entry events);

a time condition indicating the delays between keyboard events;

an indicator for the start of the count for the time condition;

a trigger of activity, after which a comparison will be made with the signature;

the context in which the comparison with the signature will be made; and the presence of a particular RAT tool or environment for the comparison with the signature.

In one aspect, the analysis comprises: determining parameters for each keyboard event, wherein the parameters include: a group to which the key belongs; a presence of a modifier; and a type of action performed with the key.

In one aspect, the analysis further comprises: determining a time condition (the time delays between adjacent keyboard events), and an indicator for a start of a counting of the time condition, separating out keyboard events which exceed a predetermined value.

In one aspect, the analysis further comprises: for each keyboard event, determining the environment in which the keyboard events occurred, and determining a context of the keyboard event. As a result of the analysis with the aid of the data analyzer 240, data is generated for further evaluation and creation of signatures.

In step 330, by the signature creator 260, the method 300 searches for sequences of keyboard events for distinguishing sessions that use RAT tools with remote control from other sessions.

In order to search for the sequences of keyboard event that enable such distinguishing, in one aspect, the method of creating n-grams of a model, as presented in the description of FIG. 3, is used. Then, the flow of keyboard events of each session is broken up into parts, thereby creating sequences of keyboard events. Then, each of the created sequences of keyboard events is related to information about a respective time condition and a respective environment.

In step 340, by the signature creator 260, for each sequence of keyboard events, method 300 determines the sequence's frequency of appearance in all the sessions. The frequency of appearance is assessed based on all the sessions, including the sessions in which remote control of a RAT tool was used. In addition, the sequences of keyboard events may be ranked by frequency of appearance in the sessions.

In step 350, by the signature creator 260, method 300 evaluates, for each sequence of keyboard events based on differences between sessions using remote control of RAT tools and all other sessions, the evaluation further being based on evaluation criteria and the frequency of occurrence of the sequence. Examples of the evaluation criteria have been given for the description of FIG. 2. If, according to the evaluation, characteristic features are identified enabling the identification of remote control of a RAT tool during the session, the scheme moves on to step 360. Otherwise, if no such characteristic features are identified, it returns to step 310.

In step 360, by the signature creator 260, method 300 creates at least one signature based on the characteristic features. An example of a signature created is given in the description of FIG. 2.

Figure 4:
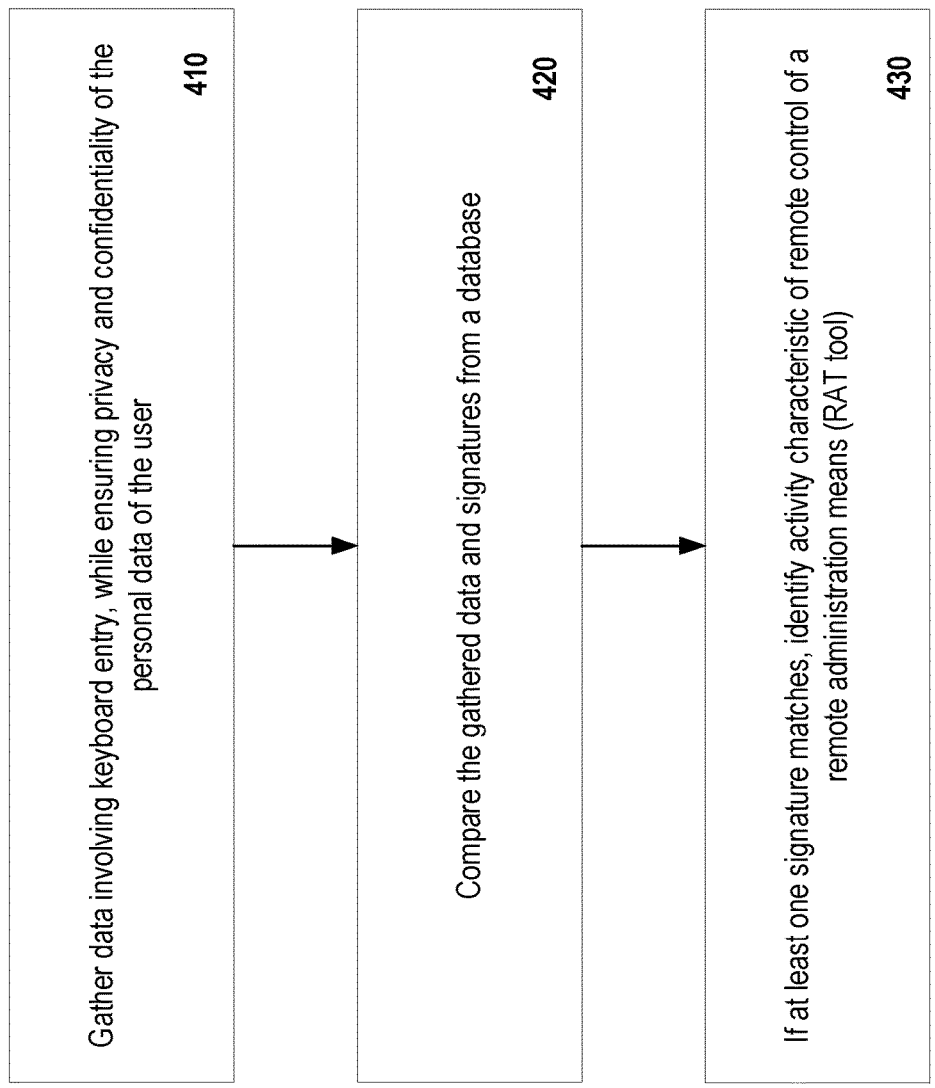
FIG. 4 illustrates an exemplary method for detecting activities being performed using a remote administration tool.

FIG. 4 illustrates an exemplary method 400 for detecting activities being performed using a remote administration tool. By "activity" is meant a series of actions taking place.

The method 400 may be realized with the aid of the system described in FIG. 1. It should be noted that the steps of the method may be implemented either in real time mode or with a certain time delay.

In step 410, by the script 117, method 400 gathers, from a flow of events, data that comprises any number of keyboard entry events, wherein each event is related at least to actions indicating a keyboard entry and a context in which the event occurred. In one aspect, each keyboard entry event describes an action performed with a key during entry from a keyboard. In other words, the script 117 gathers data that comprises events related at least to actions indicating keyboard entry and contexts in which the events occurred. It should be noted that the privacy and confidentiality of the user's personal data are ensured during the data gathering, such that it is not possible to identify that data. For example, the data gathered includes only data about the group to which the key belongs, the time characteristics, and the type of event. The data gathering includes monitoring the keyboard entry events occurring in the flow of events of the browser 115 during the session with the remote device 150.

In step 420, by the script 117, method 400, compares the keyboard entry events gathered from the flow of events with signatures from a database 148. In one aspect, the database 148 is combined with the script 117.

In one aspect, each signature comprises: a sequence of keyboard entry events (the pressing and releasing of keys of the keyboard), a time condition, and an indicator for a start of a count to calculate the time condition. In one aspect, the comparison of the keyboard events with the signatures includes: a preliminary analysis of the keyboard entry events and a search for a particular sequence of keyboard entry events which is characteristic of a remote control of a remote administration tool, wherein the preliminary analysis takes into account the context of the keyboard entry event. This preliminary analysis of the keyboard entry events is performed with the aid of a detector 140, which is combined with the script 117, and it includes:

the determination, for each keyboard entry event:
 of the group to which the key belongs;
 of the presence of a modifier being used with the key; and
 of the type of operation being performed (pressing or releasing of a key);

the determination of the time conditions indicating the delay time between adjacent events, and an indicator for the start of counting of time; and the determination of the context in which the event occurred.

In one aspect, the preliminary analysis includes a comparison with signatures corresponding to the context.

In one aspect, the comparison with the signatures corresponding to the context comprises: searching for the sequence of keyboard entry events, determining that the signature is found in the flow of events when all the conditions of the signature are fulfilled, wherein the conditions include at least finding of a particular keyboard entry sequence.

In step 430, when a match is found for at least one signature, method 400, identifies an activity which is a characteristic that indicates that the RAT tool is remotely being controlled.

Figure 5:
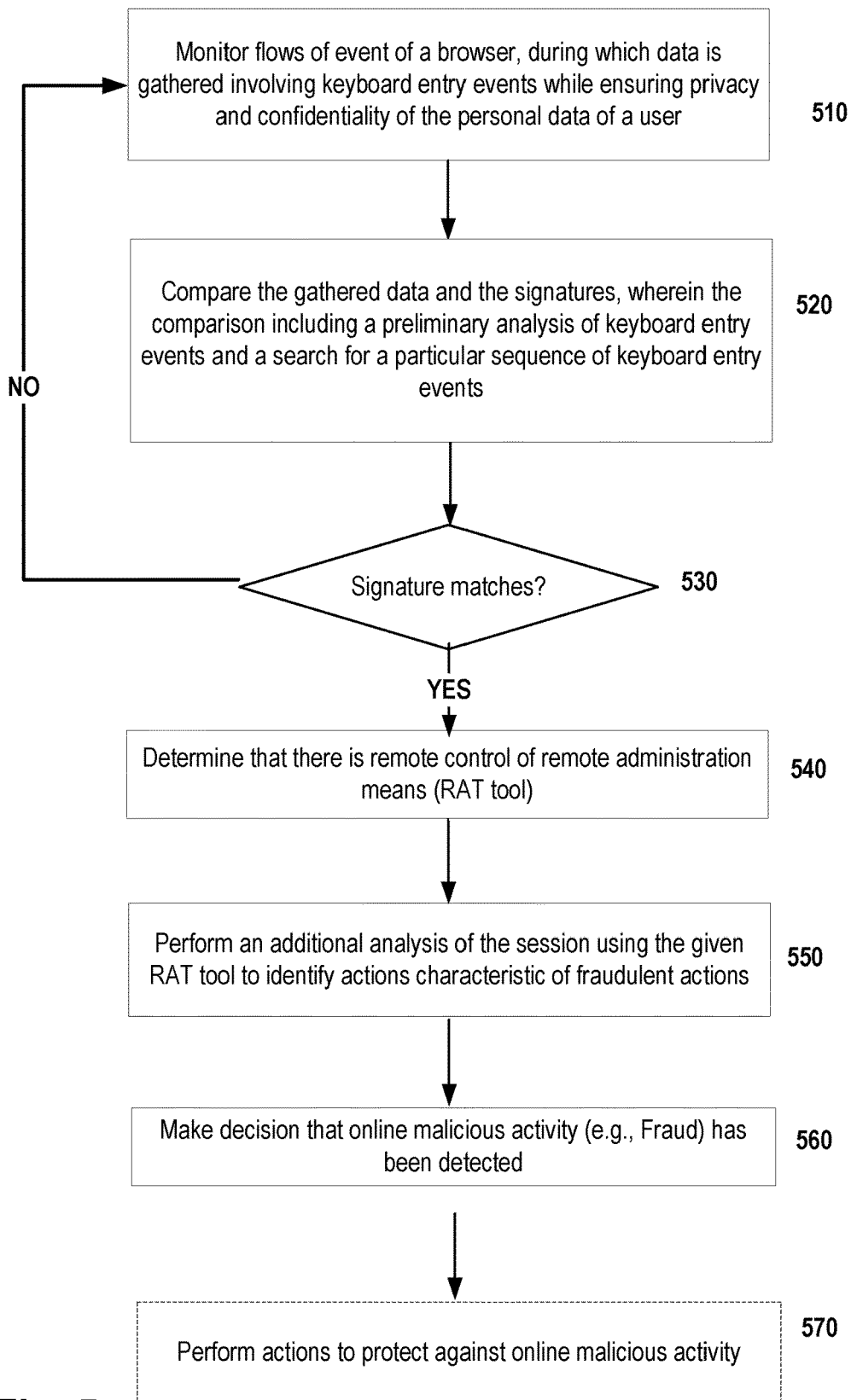
FIG. 5 illustrates an exemplary implementation of the method for detecting activities being performed using a remote administration tool.

FIG. 5 illustrates an exemplary implementation 500 of the method 400 for detecting activities being performed using a remote administration tool. For this example, the script 117 may be implemented in the context of an open web page in the browser 115, which is used to check for actions involving the pressing of keys during a session with the remote device 150. The checking is done by monitoring the keyboard entry events occurring in the flow of events of the browser 115, followed by analysis by the script 117. The following steps are carried out during this checking process.

Steps 510 and 520 are analogous to steps 410 and 420, during which the keyboard entry events are gathered and a comparison is made with signatures from the database 148. If during step 530 a signature is found in the flow of events of the browser 115, the scheme moves on to step 540. Otherwise, it returns to step 510.

In step 540, a decision is made that remote control of a RAT tool 120 has been detected.

In step 550, an additional analysis is performed on the session being carried out with the aid of the detected RAT tool 120. The analysis is aimed at evaluating the actions occurring and identifying actions involving suspicious behavior characteristic of fraudulent actions.

In step 560, a decision is made that an online malicious activity, e.g., fraud, has been detected.

In an additional step 570, actions are performed for protection against the malicious activity. Examples of those actions have been presented in the description of FIG. 1.

As described above, the method of the present disclosure advantageously solves the following technical problems:
- the need to detect and prevent fraudulent actions perpetrated using remote administration means that are used for interaction with remote services;
- the need to detect remote control of a remote administration means on the computer of a user (victim), indicating unlawful access to the computer device of the user and to remote services;
- the need to create a signature for detecting remote control of a remote administration means on the computer of a user (victim).

Each of these problems is addressed, while the various solutions presented in the description of the present disclosure may be realized either individually or collectively.

The method of the present disclosure enables detection of activities being performed remotely by means of remote administration by: analyzing the flow of keyboard entry events and detecting unique sequences of keyboard entry events that are characteristic of remote administration means (hereinafter, RAT tools) and at the same time uncharacteristic of keyboard entry events occurring during a physical entry by a user on a local keyboard. The keyboard here may be either a physical or virtual keyboard. Such an approach makes identification of remote control of the RAT tool (which is installed on the computing device of the user) possible. Then, detection of the fraudulent actions may be performed. The computer device of the user may be any modern digital computing device. Examples of such devices are a personal computer, a notebook, and mobile devices such as a tablet and a smartphone.

The detection of the indicated sequences of keyboard entry events is performed using signatures which are created. The signature enable identification of activities being performed remotely on an electronic device with the aid of a remote administration means during an interaction with remote services, for example, a session with an online bank service. Each signature (pattern) describes a sequence of keyboard entry events (pressing and releasing keys of the keyboard) with a time condition and an indicator of the start of the counting for the keyboard entry signature in order to calculate the given time condition. The time condition characterizes the delays between events of pressing and releasing keys.

The first result of the method of the present disclosure is to enhance the effectiveness of detecting Internet fraud. For example, the method may comprise: performing actions for protecting against online malicious activity, wherein the action include at least one of: interrupting a process of the remote administration tool or a network port, blocking a session with an online service, breaking a connection to a remote device, and informing a user about the identified activity. In one aspect, the malicious activity comprises a fraud conducted using a remote administration tool.

The second result is to detect activities being performed remotely on a computer by analyzing keyboard entry events and detecting unique sequences of entry events which are characteristic of specific RAT tools, with the aid of signatures. In one aspect, solutions that enable the identification and prevention of instances of fraud are provided. The frauds are frauds being perpetrated with the aid of remote administration means. The prevention of fraud is based on the analysis of keyboard entry events, detection of unique sequences of entry events which are characteristic of remote administration means, and the identification of suspicious user behavior which may indicate fraudulent activity being performed in the name of the user during interaction with a remote service, such as a banking service.

In one aspect, the method creates a signature for detecting unlawful access to a computer gained with the help of remote administration means. The method for creating the signatures is based on the analysis of historical data of keyboard entry events during interaction with RAT tools in order to detect unique sequences of entry events which are characteristic of RAT tools.

In another aspect, the detection of the activity indicates remote control on a user's computer by a remote administration means (hereinafter, RAT tools). The detection of such activity is based on the analysis of keyboard entry events and a detection of unique sequences of entry events which are characteristic of RAT tools.

Figure 6:
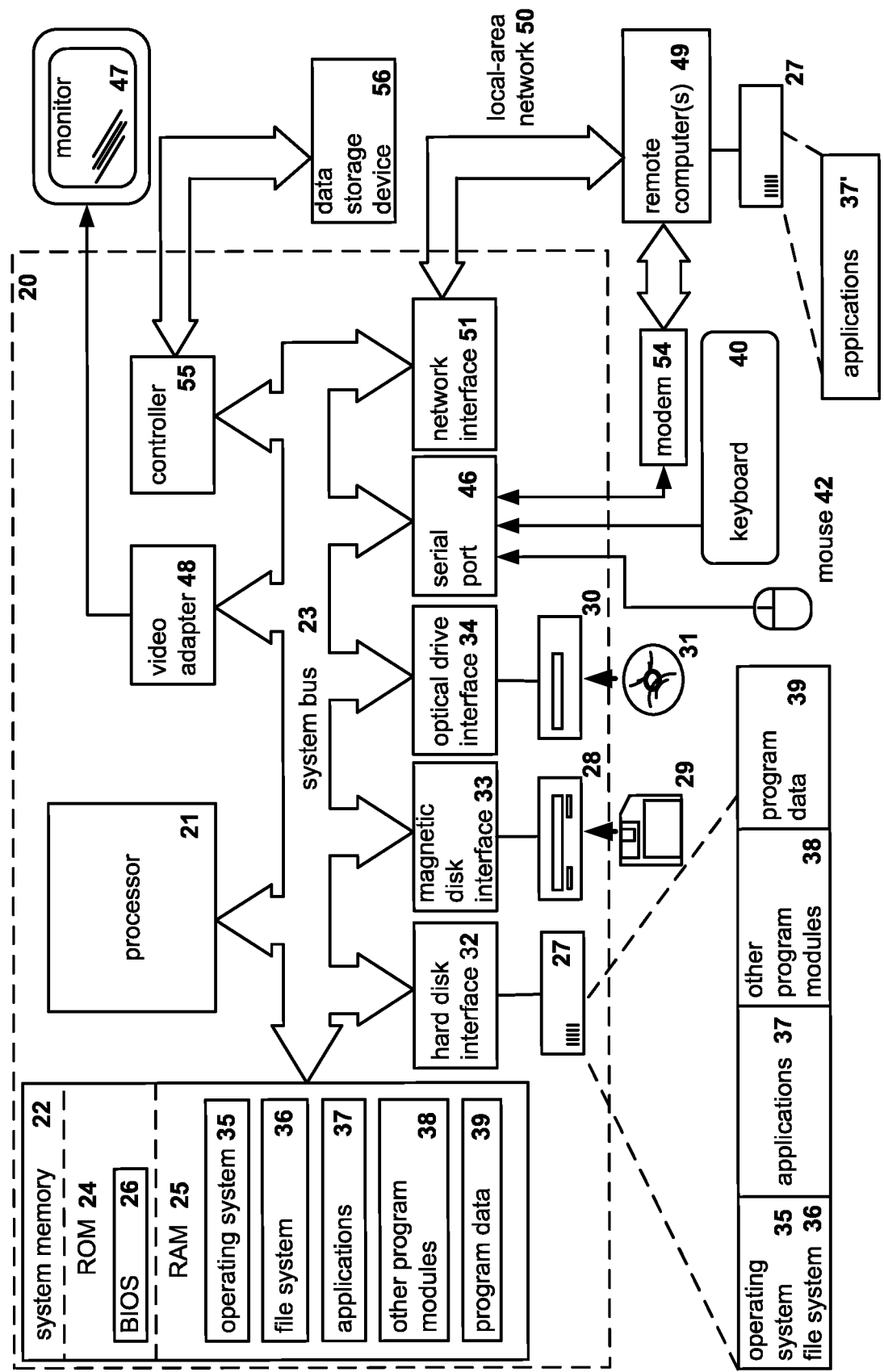
FIG. 6 presents an example of a general purpose computer system on which aspects of the present disclosure can be implemented.

FIG. 6 is a block diagram illustrating a computer system 20 on which aspects of systems and methods for detecting malicious use of a remote administration tool that may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I$^2$C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof.

The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious use of a remote administration tool of a user device, the method comprising:
   gathering, from a flow of events, data that comprises any number of keyboard entry events, wherein each event is related at least to actions indicating a keyboard entry and a context in which the event occurred;
   comparing the gathered keyboard entry events with signatures from a database; and
   when a match is found with at least one signature, identifying an activity which is a characteristic that indicates that the remote administration tool is being controlled remotely,
   wherein the remote administration tool is configured to allow authorized remote control of the user device.

2. The method of claim 1, wherein each signature comprises: a sequence of keyboard entry events, a time condition, and an indicator for a start of a count to calculate the time condition, wherein each keyboard entry event describes an action performed with a key during entry from a keyboard.

3. The method of claim 1, wherein a comparison of the keyboard events with the signatures includes: a preliminary analysis of the keyboard entry events and a search for a particular sequence of keyboard entry events which is characteristic of a remote control of a remote administration tool, wherein the preliminary analysis takes into account the context of the keyboard entry event.

4. The method of claim 3, wherein the preliminary analysis includes a comparison with signatures corresponding to the context.

5. The method of claim 3, wherein the preliminary analysis, for each keyboard entry event, includes:
   a determination of a group to which a key belongs, a presence of a modifier being used with the key, and a type of operation being performed, the type of operation including at least pressing or releasing of the key;
   a determination of a time condition indicating a delay between adjacent events, and an indicator for a start of counting of time; and
   a determination of the context in which the event occurred.

6. The method of claim 4, wherein the comparison with the signatures corresponding to the context comprises:
   searching for the sequence of keyboard entry events; and
   determining that the signature is found in the flow of events when all conditions of the signature are fulfilled, wherein the conditions include at least finding of a particular keyboard entry sequence.

7. The method of claim 1, further comprising:
   performing actions for protecting against online malicious activity, wherein the action include at least one of: interrupting a process of the remote administration tool or a network port, blocking a session with an online service, breaking a connection to a remote device, and informing a user about the identified activity.

8. The method of claim 1, wherein the malicious activity comprises a fraud conducted using a remote administration tool.

9. A system for detecting malicious use of a remote administration tool of a user device, the system comprising:
   at least one hardware processor configured to:
      gather, from a flow of events, data that comprises any number of keyboard entry events, wherein each event is related at least to actions indicating a keyboard entry and a context in which the event occurred;
      compare the gathered keyboard entry events with signatures from a database; and
      when a match is found with at least one signature, identify an activity which is a characteristic that indicates that the remote administration tool is being controlled remotely,
      wherein the remote administration tool is configured to allow authorized remote control of the user device.

10. The system of claim 9, wherein each signature comprises: a sequence of keyboard entry events, a time condition, and an indicator for a start of a count to calculate the time condition, wherein each keyboard entry event describes an action performed with a key during entry from a keyboard.

11. The system of claim 9, wherein a comparison of the keyboard events with the signatures includes: a preliminary analysis of the keyboard entry events and a search for a particular sequence of keyboard entry events which is characteristic of a remote control of a remote administration tool, wherein the preliminary analysis takes into account the context of the keyboard entry event.

12. The system of claim 11, wherein the preliminary analysis includes a comparison with signatures corresponding to the context.

13. The system of claim 12, wherein the preliminary analysis, for each keyboard entry event, includes:
- a determination of a group to which a key belongs, a presence of a modifier being used with the key, and a type of operation being performed, the type of operation including at least pressing or releasing of the key;
- a determination of a time condition indicating a delay between adjacent events, and an indicator for a start of counting of time; and
- a determination of the context in which the event occurred.

14. The system of claim 12, wherein the comparison with the signatures corresponding to the context comprises:
- searching for the sequence of keyboard entry events; and
- determining that the signature is found in the flow of events when all conditions of the signature are fulfilled, wherein the conditions include at least finding of a particular keyboard entry sequence.

15. The system of claim 9, wherein the hardware processor is further configured to:
- perform actions for protecting against online malicious activity, wherein the action include at least one of: interrupting a process of the remote administration tool or a network port, blocking a session with an online service, breaking a connection to a remote device, and informing a user about the identified activity.

16. The system of claim 9, wherein the malicious activity comprises a fraud conducted using a remote administration tool.

17. A non-transitory computer readable medium storing thereon computer executable instructions for detecting malicious use of a remote administration tool of a user device, the executable instructions including instructions for:
- gathering, from a flow of events, data that comprises any number of keyboard entry events, wherein each event is related at least to actions indicating a keyboard entry and a context in which the event occurred;
- comparing the gathered keyboard entry events with signatures from a database; and
- when a match is found with at least one signature, identifying an activity which is a characteristic that indicates that the remote administration tool is being controlled remotely,
- wherein the remote administration tool is configured to allow authorized remote control of the user device.

18. The non-transitory computer readable medium of claim 17, wherein each signature comprises: a sequence of keyboard entry events, a time condition, and an indicator for a start of a count to calculate the time condition, wherein each keyboard entry event describes an action performed with a key during entry from a keyboard.

19. The non-transitory computer readable medium of claim 17, wherein a comparison of the keyboard events with the signatures includes: a preliminary analysis of the keyboard entry events and a search for a particular sequence of keyboard entry events which is characteristic of a remote control of a remote administration tool, wherein the preliminary analysis takes into account the context of the keyboard entry event.

20. The non-transitory computer readable medium of claim 19, wherein the preliminary analysis includes a comparison with signatures corresponding to the context.

21. The non-transitory computer readable medium of claim 19, wherein the preliminary analysis, for each keyboard entry event, includes:
- a determination of a group to which a key belongs, a presence of a modifier being used with the key, and a type of operation being performed, the type of operation including at least pressing or releasing of the key;
- a determination of a time condition indicating a delay between adjacent events, and an indicator for a start of counting of time; and
- a determination of the context in which the event occurred.

22. The non-transitory computer readable medium of claim 20, wherein the comparison with the signatures corresponding to the context comprises:
- searching for the sequence of keyboard entry events; and
- determining that the signature is found in the flow of events when all conditions of the signature are fulfilled, wherein the conditions include at least finding of a particular keyboard entry sequence.

23. The non-transitory computer readable medium of claim 17, wherein the instruction further comprise instructions for:
- performing actions for protecting against online malicious activity, wherein the action include at least one of: interrupting a process of the remote administration tool or a network port, blocking a session with an online service, breaking a connection to a remote device, and informing a user about the identified activity.

24. The non-transitory computer readable medium of claim 17, wherein the malicious activity comprises a fraud conducted using a remote administration tool.

* * * * *